United States Patent
Kubo et al.

(10) Patent No.: US 9,475,906 B2
(45) Date of Patent: Oct. 25, 2016

(54) ARC-EXTINGUISHING INSULATION MATERIAL MOLDED PRODUCT AND GAS CIRCUIT BREAKER INCLUDING THE SAME

(71) Applicant: Mitsubishi Electric Corporation, Chiyoda-ku (JP)

(72) Inventors: Kazuki Kubo, Chiyoda-ku (JP); Tatsuya Okawa, Chiyoda-ku (JP); Katsuhiko Horinouchi, Chiyoda-ku (JP); Motohiro Sato, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/761,558

(22) PCT Filed: Sep. 11, 2013

(86) PCT No.: PCT/JP2013/074489
§ 371 (c)(1),
(2) Date: Jul. 16, 2015

(87) PCT Pub. No.: WO2014/122814
PCT Pub. Date: Aug. 14, 2014

(65) Prior Publication Data
US 2015/0357137 A1    Dec. 10, 2015

(30) Foreign Application Priority Data
Feb. 7, 2013    (JP) .................................. 2013-022217

(51) Int. Cl.
*H01H 33/06*    (2006.01)
*C08G 65/323*    (2006.01)
*H01H 33/22*    (2006.01)
(Continued)

(52) U.S. Cl.
CPC ............ *C08G 65/323* (2013.01); *H01H 33/06* (2013.01); *H01H 33/22* (2013.01); *H01H 33/7023* (2013.01); *H01H 33/78* (2013.01); *H01H 33/905* (2013.01); *H01H 33/7076* (2013.01); *H01H 33/91* (2013.01)

(58) Field of Classification Search
None
See application file for complete search history.

(56) References Cited

U.S. PATENT DOCUMENTS

| | | | |
|---|---|---|---|
| 3,351,619 A | 11/1967 | Warnell | |
| 4,444,671 A | * 4/1984 | Wiltgen, Jr. | ........... H01H 33/76 218/1 |

(Continued)

FOREIGN PATENT DOCUMENTS

| | | |
|---|---|---|
| CN | 1137161 | 12/1996 |
| CN | 104054151 | 9/2014 |

(Continued)

OTHER PUBLICATIONS

Machine translation of JP-2003-292761, translation generated Dec. 2015, 12 pages.*

(Continued)

*Primary Examiner* — Robert S Loewe
(74) *Attorney, Agent, or Firm* — Oblon, McClelland, Maier & Neustadt, L.L.P.

(57) ABSTRACT

The present invention relates to an arc-extinguishing insulation material molded product provided in the vicinity of a contact point between contactors in a gas circuit breaker. The arc-extinguishing insulation material molded product includes a polymer which contains a carbon-oxygen bond in the main chain, and in which a part of or all of terminal atoms are non-hydrogen atoms.

20 Claims, 2 Drawing Sheets

(51) Int. Cl.
*H01H 33/70* (2006.01)
*H01H 33/78* (2006.01)
*H01H 33/90* (2006.01)
*H01H 33/91* (2006.01)

(56) References Cited

U.S. PATENT DOCUMENTS

| | | | | |
|---|---|---|---|---|
| 4,562,322 | A | 12/1985 | Yamaguchi et al. | |
| 4,826,905 | A * | 5/1989 | Itoh | C08K 5/02 524/366 |
| 5,364,676 | A * | 11/1994 | Takago | C08L 83/12 206/521 |
| 5,841,088 | A * | 11/1998 | Yamaguchi | H01H 9/302 218/158 |
| 5,925,863 | A * | 7/1999 | Zehnder | H01H 33/7023 218/53 |
| 6,160,051 | A * | 12/2000 | Tatsu | C08F 261/06 524/366 |
| 6,570,481 | B2 * | 5/2003 | Katsube | H01H 71/02 218/158 |
| 7,645,957 | B2 * | 1/2010 | Capitanio | H01H 33/7023 218/53 |
| 9,147,543 | B2 * | 9/2015 | Horinouchi | H01H 33/86 |
| 9,230,759 | B2 | 1/2016 | Horinouchi et al. | |
| 2006/0178459 | A1 * | 8/2006 | Matsuda | B05D 5/083 524/263 |
| 2014/0367361 | A1 | 12/2014 | Horinouchi et al. | |

FOREIGN PATENT DOCUMENTS

| | | | |
|---|---|---|---|
| DE | 6 031 1485 | | 11/2007 |
| EP | 1 544 881 A1 | | 6/2005 |
| JP | 57-202003 A | | 12/1982 |
| JP | 7-312155 A | | 11/1995 |
| JP | 11-329191 A | | 11/1999 |
| JP | 2001-155595 A | | 6/2001 |
| JP | 2002-373561 A | | 12/2002 |
| JP | 2003-292761 | | 10/2003 |
| JP | 2003-297200 A | | 10/2003 |
| JP | 2003292761 A * | 10/2003 | .............. C08L 71/00 |
| JP | 2003-323837 A | | 11/2003 |
| WO | WO 2013/118348 A1 | | 8/2013 |

OTHER PUBLICATIONS

International Search Report Issued Nov. 26, 2013 in PCT/JP13/074489 Filed Sep. 11, 2013.

Office Action with Search History issued Mar. 22, 2016 in Canadian Patent Application No. 2,900,227.

Extended European Search Report, mailed Sep. 8, 2016, for Application No. 13874807.4, filed Sep. 11, 2013.

Office Action in corresponding Chinese application No. 201380072504.8, dated Jul. 20, 2016.

* cited by examiner

ARC-EXTINGUISHING INSULATION MATERIAL MOLDED PRODUCT AND GAS CIRCUIT BREAKER INCLUDING THE SAME

TECHNICAL FIELD

The present invention relates to an arc-extinguishing insulation material molded product which when being exposed to an electric arc discharged in current interruption, generates an insulation gas to extinguish the electric arc, and relates to a gas circuit breaker including the same.

BACKGROUND ART

A gas insulated switchgear (GIS) is a device used to disconnect and/or reconnect high-voltage power lines in power transforming stations, power generation plants, power receiving equipments and the like. Such gas insulated switchgear includes such as a circuit breaker, a circuit disconnector, bus lines, a lightning protector, an instrumental transformer and/or a grounding device housed in a single grounded container filled with a high-insulation gas.

Compared with a common air insulated switchgear, a gas insulated switchgear can be made significantly smaller. In recent years, due to the escalating of land prices, it is difficult to assure a greater installation space, and thereby, such a gas insulated switchgear which can be made smaller has been employed and installed in many electrical switchgear stations.

The gas circuit breaker is a device that can interrupt an electric line when the line is subjected to a short circuit, an over current or an earth fault. The gas circuit breaker is configured to blow gas to an electric arc discharged between electrode contacts of a circuit breaker when interrupting the current so as to extinct (extinguish) the arc discharge. Up to now, various efforts have been made in the gas circuit breaker to blow arc-extinguishing gas to an electric arc discharged between a movable contactor and a fixed contactor at the time of circuit interruption so as to efficiently extinguish the electric arc in performing the circuit interruption operation (see PTD 1 (Japanese Patent Laying-Open No. 7-312155) and PTD 2 (Japanese Patent Laying-Open No. 2001-155595)).

The insulation gas to be used in the gas insulated switchgear (GIS) and the gas circuit breaker is generally sulfur hexafluoride ($SF_6$). Sulfur hexafluoride has a high insulation property, and the insulation strength thereof is up to three times as that of air. In addition, sulfur hexafluoride is inert and high in thermal conductivity, which makes it possible to rapidly cool down the electrodes overheated by the discharged electric arc.

Currently, a main interrupting approach in the gas circuit breaker is puffer-type circuit interruption in which a piston is driven to operate in conjunction with the disconnection operation of electrodes so as to blow insulation gas such as sulfur hexafluoride to the electrodes. Generally, in order to efficiently interrupt the circuit with an operating force under a small current, a heating chamber (thermal puffer) is provided for the purpose of utilizing the heat of the electric arc to increase the pressure of the insulation gas or a pair of cylinder and piston (machine puffer) is provided for the purpose of decreasing the volume of the insulation gas through mechanical forces so as to increase the pressure of the insulation gas. In recent years, due to the demand for increasing the interruption capacity in response to the increase of interruption current or the decrease in interruption points or the request for making the device smaller, the processing energy per unit volume in an arc-extinguishing chamber of a gas circuit breaker increases, and thereby, the arc-extinguishing performance is required to be made more powerful than the conventional one.

In the puffer-type gas circuit breaker mentioned above, there has been proposed as one of the promising solutions for achieving a powerful arc-extinguishing performance by disposing inside the arc-extinguishing chamber a resin material which decomposes at the exposure to an electric arc and generates gas to extinguish the electric arc.

In such a gas circuit breaker, an arc-extinguishing insulation material molded product contributing to arc-extinguishing is disposed in the periphery of contacts of electrodes to be disconnected or connected. When the arc-extinguishing insulation material molded product is exposed to the light and heat from an electric arc, the constituent material of the molded product itself decomposes to generate gas, and the generated gas promotes the extinguishing of the electric arc through blowing so as to cool down the electric arc, through increasing the pressure of insulation gas so as to weaken the electric arc, or through increasing insulation resistance.

For example, in the conventional gas circuit breaker shown in PTD 3 (Japanese Patent Laying-Open No. 2003-297200), a member made of a polymer is disposed inside a heating chamber, and when the member is heated by an electric arc in the arc space, it generates evaporation gas containing no oxygen in the chemical composition thereof to enhance the pressure increase in the heating chamber.

PTD 4 (Japanese Patent Laying-Open No. 11-329191) illustrates resins composed of carbon atoms and hydrogen atoms such as polystyrene, polyethylene, polypropylene and polymethyl pentene as examples of materials which generate evaporation gas when being heated by an electric arc. Since each of these resins can generate hydrogen gas or hydrocarbon gas having excellent thermal diffusion effect, it is possible for it to efficiently cool down the electric arc and thereby exhibit excellent arc-extinguishing performance.

PTD 4 further illustrates resins such as polyoxymethylene, polyethylene, polypropylene, polytetrafluoroethylene and melamine as examples of materials for generating evaporation gas.

However, in the above-mentioned prior arts, when the decomposition gas generated at the exposure to an electric arc is mixed with a blowing gas to perform arc extinguishing, after the circuit interruption is finished and the blowing gas is cooled to approximately several hundred degrees, water moisture may be produced therefrom. The main reason thereof is because the water moisture is formed from oxygen and hydrogen atoms in the polymer. It is known that in the gas circuit breaker, when the content of water moisture increases from several hundred PPM to several thousand PPM, the insulation member made of insulation materials will be deteriorated. Therefore, in a conventional gas circuit breaker, the insulation performance and the blocking performance may not be achieved sufficiently after the current interruption. Furthermore, the water moisture dissolves fluoride compound generated as a decomposition product in the current interruption and turn into hydrofluoric acid, which may corrode the metal components.

Thus, in the conventional gas circuit breaker, polytetrafluoroethylene resin that does not cause the insulation deterioration of the insulation member is often used as a material for generating the decomposition gas.

However, in order to meet the demand for increasing the interruption capacity in response to the increase of interruption current or the decrease in interruption points or to meet the demand for making the device smaller, the gas generated from polytetrafluoroethylene resin is not sufficient in pressure, an arc-extinguishing insulation material which has a higher arc-extinguishing performance is required.

CITATION LIST

Patent Document

PTD 1: Japanese Patent Laying-Open No. 7-312155
PTD 2: Japanese Patent Laying-Open No. 2001-155595
PTD 3: Japanese Patent Laying-Open No. 2003-297200
PTD 4: Japanese Patent Laying-Open No. 11-329191

SUMMARY OF INVENTION

Technical Problem

The present invention has been accomplished in view of the aforementioned problems, and it is therefore an object of the present invention to provide an arc-extinguishing insulation material molded product capable of generating a greater amount of gas at exposure to an electric arc so as to achieve stable and high interruption performance and capable of extinguishing the deterioration (insulation deterioration) of an insulation member made of an insulation material in a gas circuit breaker, and a gas circuit breaker including the same.

Solution to Problem

The present invention relates to an arc-extinguishing insulation material molded product provided in the vicinity of a contact point between contactors in a gas circuit breaker. The arc-extinguishing insulation material molded product includes a polymer which contains a carbon-oxygen bond in the main chain and in which a part of or all of terminal atoms are non-hydrogen atoms.

It is preferable that the polymer is the main component. It is preferable that the content of hydrogen atoms in the constituent elements in the polymer is not more than 2 mass %. It is preferable that the non-hydrogen atoms are fluorine atoms.

The polymer is preferably a polyether-based polymer, and more preferably a fluorinated polyether-based polymer. Further, it is preferable that the polymer contains silicon atoms in the main chain.

It is preferable that the polymer is a silicone cross-linked product of fluorinated polyether. It is preferable that the polymer contains silicon dioxide.

It is preferable that the arc-extinguishing insulation material molded product mentioned above contains at least one selected from a group consisting of boron nitride, aluminum oxide and titanium oxide as a wear-resistant filler.

The present invention also relates to a gas circuit breaker including an arc-extinguishing insulation material molded product provided in the vicinity of an electrode. It is preferable that an insulation gas used for circuit interruption is SF6 gas.

Advantageous Effects of Invention

In the polymer constituting the arc-extinguishing insulation material molded product of the present invention, since the carbon-oxygen bond (C—O bond) contained in the main chain is prone to cleavage, which makes the polymer easy to decompose, and thereby in the case where the arc-extinguishing insulation material molded product of the present invention is used in a gas circuit breaker, the more amount of gas will be generated at the exposure to an arc, and thus, it is possible to increase the pressure in the arc-extinguishing chamber sufficiently high, which makes it possible to achieve a stable and high interruption performance. Moreover, since the content of hydrogen atoms in the polymer is low, HF or $H_2O$ generated from decomposition at the exposure to an electric arc is inhibited, which makes it possible to inhibit the corrosion to the insulation materials or the insulation deterioration of the insulation materials used in the gas circuit breaker.

Moreover, in the case where the main chain of the polymer contains silicon (Si) atoms, a liquid or paste-like material made of a high-molecular compound having a fluorinated polyether backbone and a terminal silicone cross-linking reaction group can be used in molding, which improves formability. Furthermore, the cured product of the high-molecular compound is superior in both chemical durability and heat resistance.

In the case where the arc-extinguishing insulation material molded product contains at least one selected from a group consisting of boron nitride, aluminum oxide and titanium oxide as a wear-resistant filler, since each of the abovementioned wear-resistant fillers can absorb light in the deep ultraviolet region and have great reflectance to light in the regions of near ultraviolet light, visible light and infrared light, it can prevent the arc light from entering into the insulation material molded product, and thus, it is possible to prevent the arc-extinguishing insulation molded product from being decomposed excessively.

Furthermore, by applying the arc-extinguishing insulation material molded product of the present invention to a gas circuit breaker, it is possible to make the gas circuit breaker excellent in interruption performance, superior in inhibiting the deterioration of insulation performance after interruption and thereby superior in reliability.

BRIEF DESCRIPTION OF DRAWINGS

FIGS. 2A and 2B are each a schematic sectional view illustrating an arc-extinguishing device for the gas circuit breaker according to the fourth embodiment of the present invention, wherein FIG. 2A illustrates the state of a first half of the interruption process of the gas circuit breaker, and FIG. 2B illustrates the state of a second half of the interruption process of the gas circuit breaker.

DESCRIPTION OF EMBODIMENTS

Figure 1:
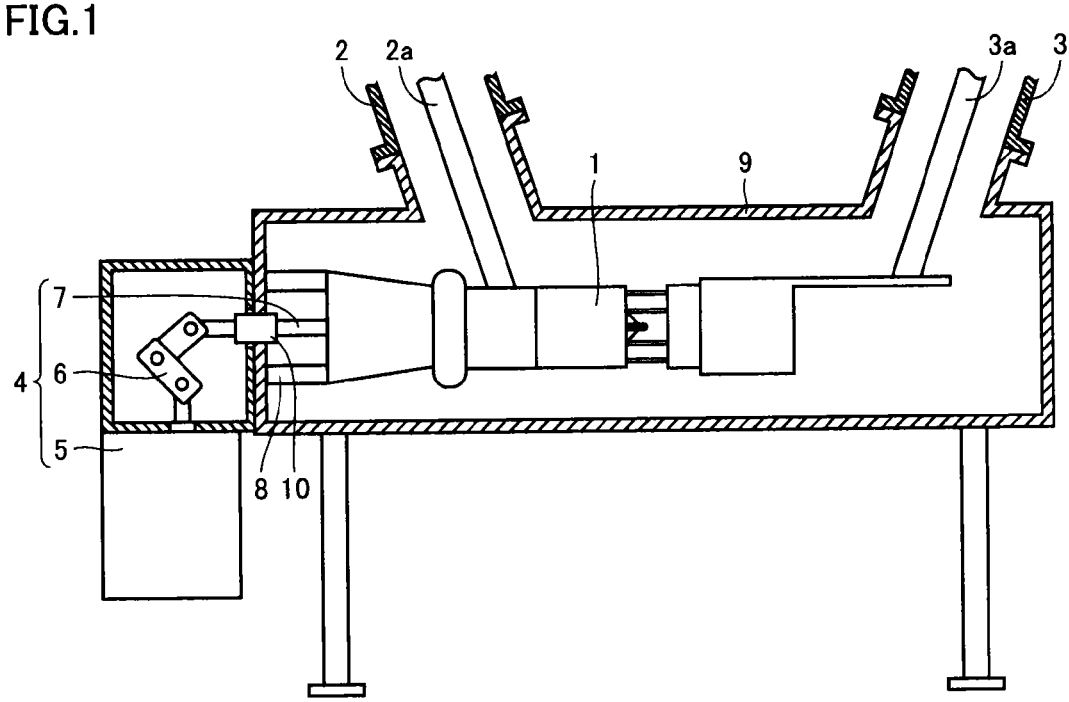
FIG. 1 is a schematic sectional view illustrating a gas circuit breaker according to a fourth embodiment of the present invention.

Hereinafter, the present invention will be described in detail. The following embodiments will be described with reference to the drawings, and in the drawings of the present application, those parts designated by the same reference numerals indicate the same or corresponding parts.

First Embodiment

First Arc-Extinguishing Insulation Material Molded Product

The arc-extinguishing insulation material molded product of the present embodiment is configured to extinguish an electric arc discharged between electrodes (between a movable contactor and a fixed contactor, for example) involved in current interruption in a gas circuit breaker by blowing an insulation gas to the electric arc, and is provided in the vicinity of a contact point between contactors near a space where the electric arc is discharged.

The polymer constituting the arc-extinguishing insulation material molded product of the present invention has a carbon-oxygen bond in the main chain, and a part of or all of terminal atoms are non-hydrogen atoms.

It is preferable that the content of hydrogen atoms (hydrogen content) in the constituent elements in the polymer is not more than 2 mass %. It is more preferable that the hydrogen content in the polymer is not more than 1 mass %, and it is further preferable that the polymer is substantially free of hydrogen atoms.

The non-hydrogen atoms are not particularly limited as long as they can serve as a substituent. For example, at least one kind of atoms selected from fluorine atoms, chlorine atoms, bromine atoms, iodine atoms and astatine atoms may be given as examples of the non-hydrogen atoms, and it is preferable that the non-hydrogen atoms include at least fluorine atoms. Among all the atoms, fluorine atom has the highest electronegativity and can bond firmly with various atoms including carbon atoms without being chemically separated with ease, and thereby, if a part of or all of terminal atoms are fluorine atoms, the polymer will become superior in heat resistance and chemical resistance.

As a specific example of the polymer, for example, a high-molecular compound represented by the following chemical formula (Formula 1-1) may be given.

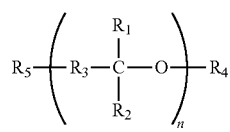

(Formula 1-1)

In the formula, each of $R_1$, $R_2$, $R_3$, $R_4$ and $R_5$ is an independent functional group containing carbon, nitrogen, oxygen, silicon, hydrogen, fluorine and the like. It is preferable that at least one of the functional groups of $R_1$, $R_2$, $R_3$, $R_4$ and $R_5$ contains a fluorine atom. In the formula, n is a natural number, and is preferably 2 to 5000 (the same applies to the chemical formulas hereinafter).

More specifically, the polymer is preferably a polyether-based material, and more preferably a fluorinated polyether-based material. In addition, it is preferable that the polyether-based material contains no benzene ring in the repeating unit of the polyether. Since benzene ring is difficult to decompose, and if the benzene ring is contained at a large content, when the material is exposed to an electric arc, carbide will be generated at a large amount, the insulation performance may be reduced thereby.

As examples of the fluorinated polyether-based materials, the compounds represented by the following chemical formulas (Formula 1-2) to (Formula 1-9) may be given.

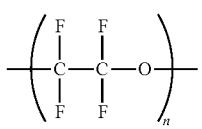

(Formula 1-2)

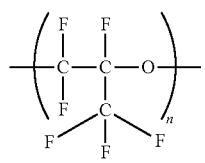

(Formula 1-3)

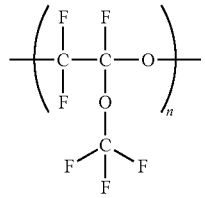

(Formula 1-4)

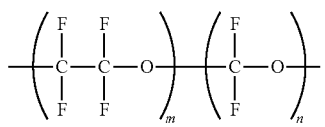

(Formula 1-5)

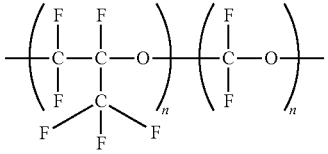

(Formula 1-6)

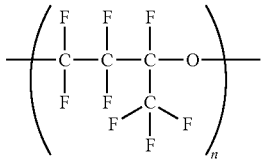

(Formula 1-7)

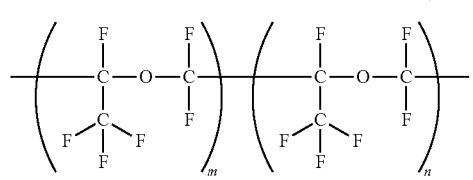

(Formula 1-8)

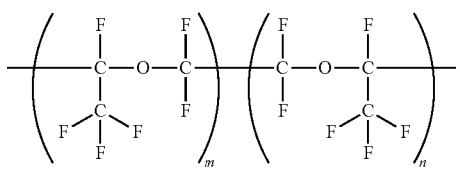

(Formula 1-9)

In the formulas, m is a natural number, and is preferably 2 to 5000 (the same applies to the chemical formulas hereinafter).

Each polymer mentioned above is such a material (ablation material) that when being exposed to an electric arc, it will be caused to decompose and generate gas by the light and heat from the electric arc. Thus, it is preferable that the material has a bond easy to be cleaved. In order to ensure the polymer to decompose and gasify easily, it is preferable that the main chain (the longest bond in the high-molecular compound) of the high-molecular compound constituting the polymer contains a carbon-oxygen bond, which makes it possible to generate more gas so as to increase the gas pressure when being exposed to an electric arc.

The polymer (i.e., a polymer which has a carbon-oxygen bond in the main chain and in which a part of or all of terminal atoms are non-hydrogen atoms) itself may be used as a resin material to form the arc-extinguishing insulation material molded product alone, or it may be used in combination with other resin materials. The polymer may be in liquid form, and in this case, the arc-extinguishing insulation material molded product may be formed by any method such as by impregnating a base material of the arc-extinguishing insulation material molded product with the liquid-form polymer, by encapsulating the liquid-form polymer in a capsule, or by soaking the liquid-form polymer into a porous filler.

Preferably, the ratio of the polymer contained in the arc-extinguishing insulation material molded product is greater than 10 mass %. More preferably, the ratio of the polymer to the total amount of organic material components contained in the arc-extinguishing insulation material molded product is at least 50 mass %.

It is preferable that the arc-extinguishing insulation material molded product contains the polymer as the main component. The main component means that a material accounts for at least 50 mass % relative to the total amount of the organic material components contained in the arc-extinguishing insulation material molded product.

hydrogen atoms in the constituent elements of the arc-extinguishing insulation material molded product with other atoms such as fluorine atoms, it is possible to suppress the deterioration of the insulation performance of the insulation member made of insulation material.

Second Embodiment

Second Arc-Extinguishing Insulation Material Molded Product

Although the polymer constituting the arc-extinguishing insulation material molded product of the present embodiment is also a fluorinated polyether-based polymer, it is different from that of the first embodiment in that it contains silicon atoms in the main chain.

As examples of the polymer constituting the arc-extinguishing insulation material molded product of the present embodiment, the compounds represented by the following chemical formulas (Formula 2-1) to (Formula 2-4) may be given.

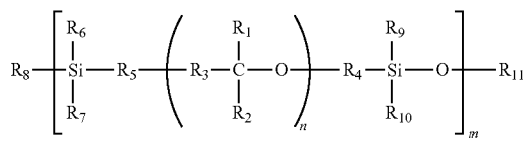
(Formula 2-1)

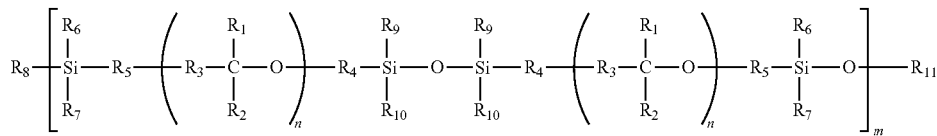
(Formula 2-2)

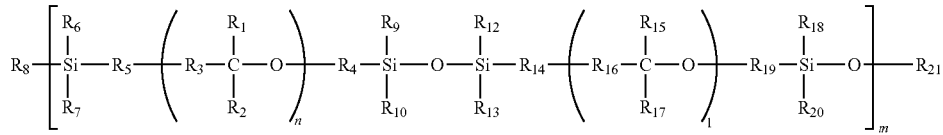
(Formula 2-3)

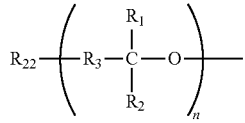
(Formula 2-4)

The inventors of the present invention have found that the use of such a material that contains a large amount of hydrogen atoms, for example, polyoxymethylene resin, melamine resin or the like, will cause the insulation performance of a member made of the insulation material to deteriorate. It is believed that the reason may be that in the case where a compound contains hydrogen atoms, when the compound is exposed to the electric arc, hydrogen atoms will react with substances (for example, $SF_6$, $SF_4$, $H_2O$, etc.) in $SF_6$ gas to generate corrosive gases (in the case of $SF_6$ gas, HF is generated), and these corrosive gases deteriorate the insulation performance of the member made of insulation material. If the insulation performance of the insulation member is reduced, it is impossible to maintain sufficient insulation performance after current interruption, which makes it impossible to achieve the required interruption performance. Thus, by replacing a part of or all of the In the formulas, each of $R_1$, $R_2$, $R_3$, $R_4$ and $R_5$ is an independent substituent containing atoms selected from a group consisting of carbon atoms, fluorine atoms, oxygen atoms, nitrogen atoms and sulfur atoms. Each of $R_4$, $R_5$, $R_{14}$ and $R_{19}$ is an independent and intermediate substituent containing at least one kind of atoms selected from a group consisting of oxygen atoms, nitrogen atoms and sulfur atoms, or an independent and intermediate substituent containing an amide bond or a sulfonamide bond. Each of $R_6$ to $R_{13}$ and $R_{18}$ to $R_{21}$ is an independent substituent containing atoms selected from a group consisting of carbon atoms, fluorine atoms, hydrogen atoms, oxygen atoms, nitrogen atoms, silicon atoms and sulfur atoms.

In the chemical formula (Formula 2-4), $R_{22}$ represents a fluorinated polyether group. As a specific example of such fluorinated polyether group, any of six substituent groups listed in the following (Formula 2-5) may be given.

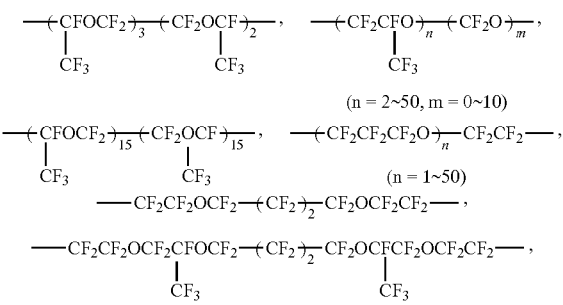

(Formula 2-5)

It is also possible to use a polymer of the abovementioned compounds having a terminal cross-linking reaction group. As examples of the terminal cross-linking reaction group, an Si—OH group, an Si—X group (X is an acetoxy group or an isopropenoxy group, etc.), an Si—OCH$_3$ group, an unsaturated ethylene group and the like may be given. As examples of the polymer, a polymer formed through condensation reaction of a compound with a terminal Si—OH group to a compound with a terminal Si—X group (X is an acetoxy group or an isopropenoxy group, etc.), or a polymer formed through hydrolysis condensation reaction of a compound with a terminal Si—OCH$_3$ group, or a polymer formed through addition reaction of a compound having unsaturated ethylene groups at both ends to an organic silicon compound having two or more Si—H groups in one molecule may be given.

In addition, in the case where the terminal cross-linking reaction group in a compound is a silicone cross-linking reaction group, it is possible to mix the compound with a filler (such as silica particles) made of silicon dioxide (silica) so as to polymerize the compound with some of hydroxyl groups on the surface of silicon dioxide through the intermediary of silicon dioxide to form a polymer. By adjusting the amount of the silicon dioxide filler, it is possible to adjust the hardness of the arc-extinguishing insulation material molded product.

As specific examples of the compounds in the present embodiment, the compounds represented by the following chemical formulas (Formula 2-6) to (Formula 2-8) and polymers formed from these compounds may be given.

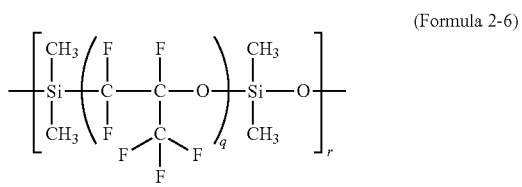

(Formula 2-6)

In the chemical formula (2-6), q and r are each an integer from 2 to 1000.

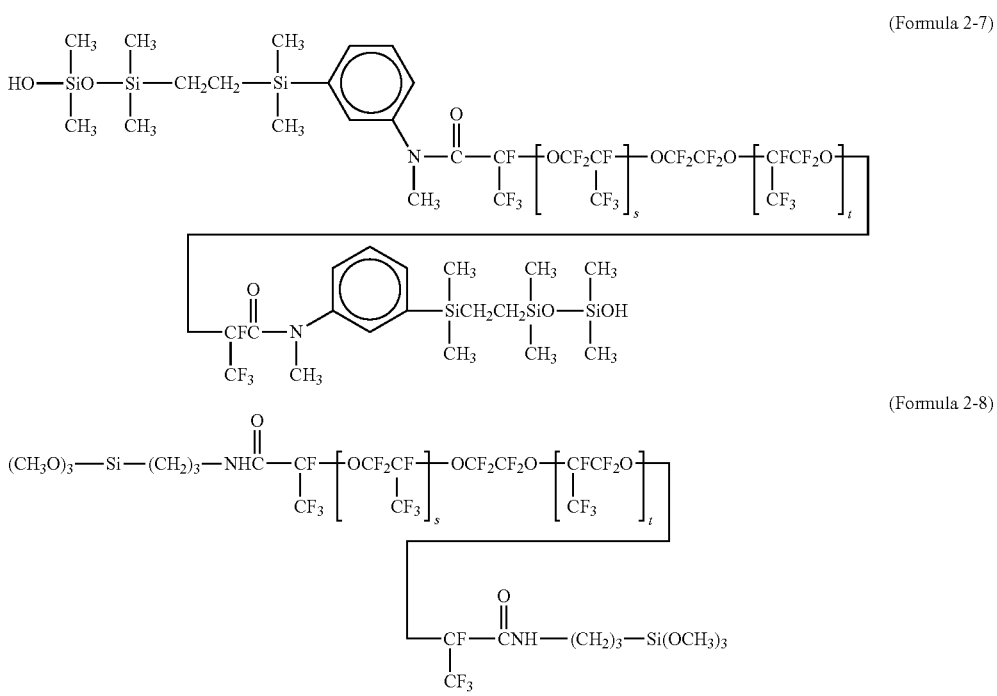

In the chemical formulas (Formula 2-7) and (Formula 2-8), s and t are each natural numbers, and the sum of s and t is 2 to 200.

In the arc-extinguishing insulation material molded product of the present invention, for the purpose of increasing strength or bulking, it is possible to formulate the fluorinated polyether-based polymer of 100 parts by weight with a filler of 500 parts by weight or less, and preferably with a filler of 10 to 100 parts. As examples of the filler, reinforcing agents such as aerosol silica, precipitated silica, carbon powder, titanium dioxide, aluminum oxide, quartz powder, talc, sericite and bentonite, and fibrous fillers such as glass fibers and organic fibers may be given.

If necessary, a condensation curing catalyst such as an organic tin compound or an organic titanium compound, an oil resistance improving agent such as potassium methacrylate, a coloring agent, a heat resistance improving agent such as iron oxide red or cerium oxide, a cold resistance improving agent, a thixotropic agent such as polyether, a dehydrating agent, or an adhesion enhancing agents such as γ-aminopropyl triethoxy silane may be added. These chemical agents may be added respectively at an amount sufficient to obtain a cured product superior in solvent resistance, chemical resistance, heat resistance and cold resistance for different purposes.

In the polymer constituting the arc-extinguishing insulation material molded product of the present invention, since the carbon-oxygen bond (C—O bond) contained in the main chain is easy to be cleaved, which makes the polymer easy to decompose and generate a large amount of gas, and thus, it is possible to increase the pressure in the arc-extinguishing chamber sufficiently high, which makes it possible to achieve a stable and high interruption performance. Moreover, since the content of hydrogen atoms in the constituent material is reduced, HF or $H_2O$ generated from decomposition at the exposure to an electric arc is inhibited, which makes it possible to inhibit the corrosion to the insulation materials or the insulation deterioration of insulation materials used in the gas circuit breaker.

Moreover, the addition of Si atoms to the main chain of the polymer makes it possible to use a liquid or paste-like material having a fluorinated polyether backbone and a terminal silicone cross-linking reaction groups in molding, superior in formability. Furthermore, the cured product is superior in both chemical durability and heat resistance.

Third Embodiment

Arc-Extinguishing Insulation Material Molded Product Added with Wear-Resistant Filler The arc-extinguishing insulation material molded product of the present embodiment is obtained by further adding at least one (wear-resistant filler) selected from a group consisting of boron nitride, aluminum oxide and titanium oxide to the arc-extinguishing insulation material molded product described in the first embodiment and the second embodiment.

When the current is interrupted in a gas circuit breaker, a plasma arc of a high temperature of 10000K to 20000K is generated between a movable contactor and a fixed contactor. Conventionally, in order to extinguish the plasma arc, an insulation gas such as air, $SF_6$ gas or the like is blown from an insulation nozzle onto the plasma arc. The arc light generated in high pressure air or high pressure gas from the high-temperature plasma arc is known to have a strong energy intensity at 200 nm to the near infrared region. Therefore, when the insulation nozzle is exposed to the arc light, the arc light generated by the plasma arc will not only reach the superficial layer of the nozzle but also enter into the inside of the nozzle, causing voids to occur or carbons to explode inside the nozzle (internal explosion), and thereby significantly reducing the insulation performance.

Furthermore, due to the repeated interruption operations, the wear amount of the insulation nozzle will increase, and as a result, the interruption performance will be decreased disadvantageously.

As described in the above, the arc light includes the light of a wide wavelength from ultraviolet to infrared region, and is particularly strong in deep ultraviolet region. It is believed that the resin constituting the arc-extinguishing insulation material molded product absorbs the arc light in the entire wavelength region and thereby decomposes. Since the wear-resistant filler has a high reflectance to light from the near ultraviolet to infrared region, it is believed that it can suppress the wear amount of the arc-extinguishing insulation material. Furthermore, by adding an inorganic filler having a strong absorption in the deep ultraviolet region as a wear-resistant filler, it is possible to absorb energy intensively at the superficial layer, which makes it possible to suppress the wear amount of the arc-extinguishing insulation material more reliably. In other words, due to the high reflectance of the wear-resistant filler to the light from the near ultraviolet to infrared region, the light can be prevented from entering into the inner side of the arc-extinguishing insulation material molded product in the depth direction, and further, due to the absorption of the arc light in the deep ultraviolet region by the wear-resistant filler, the energy can be absorbed at the superficial layer, and thereby, in combination with the prevention of the entering of light, it is possible to suppress the internal explosion in the arc-extinguishing insulation material molded product, and furthermore, due to the absorption of energy in a relatively superficial layer, even though the wear amount is reduced, the gas decomposed from the arc-extinguishing insulation material molded product is of a lower molecule, which thereby increases the molar amount of the generated gas, and as a result, not only the wear amount is suppressed but also the pressure of the generated gas is prevented from decreasing.

Since these inorganic fillers such as boron nitride, aluminum oxide and titanium oxide each have a high reflectance to light from the near ultraviolet to infrared region and a strong absorption in the deep ultraviolet region, they are suitable as a filler (wear-resistant filler) for extinguishing the wear amount of the arc-extinguishing insulation material molded product. In particular, boron nitride is more preferable since boron nitride has a higher reflectance to light from the near ultraviolet to infrared region and a stronger absorption in the deep ultraviolet region.

The average particle size of the wear-resistant filler (at least one selected from a group consisting of boron nitride, aluminum oxide and titanium oxide) is preferably from 0.5 μm to 20 μm, and more preferably from 1 μm to 10 μm. In the present embodiment, the average particle size is a value measured by particle size distribution measurement according to the laser diffraction scattering method. The smaller the particle size is, the greater the surface area will be, and the higher the reflectance to light from the near-ultraviolet to infrared region will be, which makes it possible for the arc-extinguishing insulation material molded product to have stronger absorption in the deep ultraviolet region so as to exhibit effectively the wear-extinguishing effect. Thus, the average particle size is preferably not more than 20 μm, and more preferably not more than 10 μm. In addition, it is preferable that the maximum particle size is not more than 50 μm. In the present embodiment, the maximum particle size refers to such a particle size that a cumulative frequency in the measurement of the particle size distribution is 99%. On the other hand, if the average particle size of the wear-resistant filler is too small, when it is formulated with a polymer or the like mentioned in the above, the viscosity of the mixture becomes greater, degrading the formability, and thus, the average particle size of the wear-resistant filler is preferably not less than 0.5 μm.

The formulation amount of the wear-resistant filler is preferably 0.1 vol % to 20 vol %, and more preferably 0.5 vol % to 10 vol %. If the formulation amount is less than 0.5 vol %, and particularly not more than 0.1%, it is insufficient for the filler to exhibit the wear resistance. On the other hand, if the formulation amount is too much, the viscosity of the polymer or the like formulated with the wear-resistant filler will become greater, and thus, the formability will be deteriorated and the amount of gas to be generated will be reduced as well. Accordingly, the formulation amount is preferably not more than 20 vol %, and more preferably not more than 10 vol %.

In order to provide that the light reflectance of the molded product is not less than 85% at a wavelength of 240 nm to 1300 nm, the particle size and the formulation amount of the wear-resistant filler should be appropriately set in such a way that the average particle size is in a range of 0.5 μm to 20 μm and preferably 1 μm to 10 μm, and the maximum particle size is not more than 40 μm, and the formulation amount is 0.1 vol % to 20 vol % and particularly is 0.5 vol % to 10 vol %. As long as the particle size and the reflectance mentioned above are satisfied, any kind of fillers such as a flat-shaped filler and an irregularly shaped filler (pulverized filler) may be be used as the wear-resistant filler. In addition, if the wear-resistant filler contains other materials even at a minute amount, it will absorb light in the ultraviolet region, which is a main factor of lowering the reflectance of the molded product, and thereby, it is desirable that the purity of the wear-resistant filler is not less than 99%.

Fourth Embodiment

Gas Circuit Breaker

FIG. 1 is a schematic sectional view illustrating an example of a gas circuit breaker according to the fourth embodiment of the present invention. In the gas circuit breaker illustrated in FIG. 1, an arc-extinguishing device 1 is electrically connected between a first conductor 2a extending from a first bushing 2 and a second conductor 3a extending from a second bushing 3. A drive mechanism 4 for driving a movable conductive conductor 11 (illustrated in FIGS. 2A and 2B) is configured to include an operating member 5 which operates through for example a spring mechanism or a hydraulic mechanism, a link 6, and an insulation rod 7. Movable conductive conductor 11 is coupled to link 6 through the intermediary of rod 7, and is moved by operating device 5 to perform disconnection operation or connection operation.

In order to slide a part extending from rod 7 out of a housing 9 configured to seal arc-extinguishing device 1 in an arc-extinguishing gas while maintaining it in air-tight, a slidable unit 10 having an O-ring for example is provided to the part. Moreover, arc-extinguishing device 1 is supported by an insulation supporter 8 and kept isolated from housing 9.

Figure 2A:
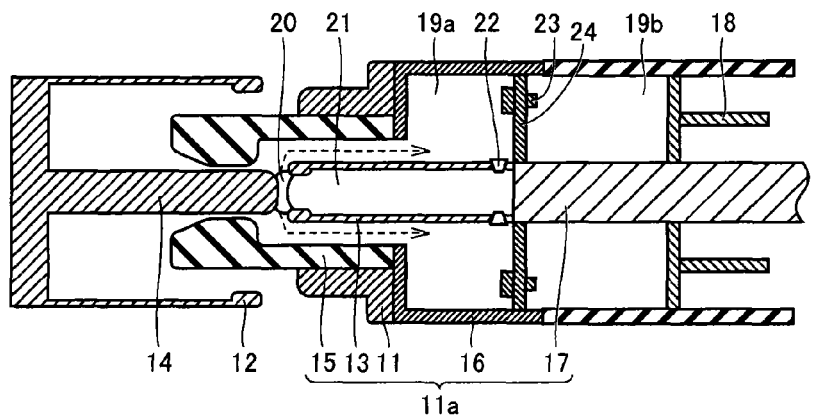
Figure 2B:
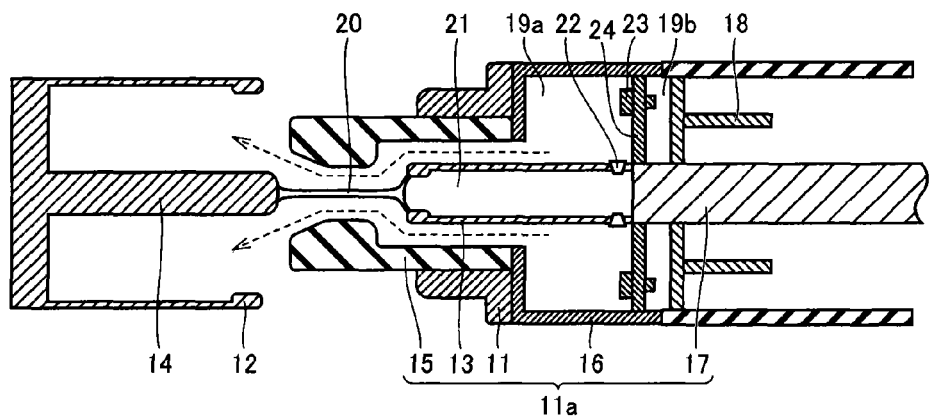

FIGS. 2A and 2B are each an example of a schematic cross-sectional view illustrating a main part of the arc-extinguishing device for the gas circuit breaker according to the fourth embodiment. FIG. 2A illustrates the state of a first half of the interruption process of the gas circuit breaker, and FIG. 2B illustrates the state of a second half of the interruption process of the gas circuit breaker. The gas circuit breaker illustrated in FIGS. 2A and 2B houses, in housing 9 (see FIG. 1) which is filled with an arc-extinguishing gas, a movable conductive contactor 11 and a movable arc contactor 13, which are disposed opposite to a fixed conductive contactor 12 and a fixed arc contactor 14, respectively. An insulation nozzle 15 is provided around the outer periphery of movable arc contactor 13 and around the outer periphery of fixed arc contact 14, and is secured to a puffer cylinder 16 provided at the movable side. In the present embodiment, a part of or all of the insulation nozzle is formed from the arc-extinguishing insulation material molded product according to the first to third embodiments.

In the case of forming a part of insulation nozzle 15 by using the arc-extinguishing insulation material molded product, the arc-extinguishing insulation material molded product is disposed at a position without significantly deforming a flow path formed by insulation nozzle 15 and movable arc contactor 13. Additionally, although not shown in the figure, it is acceptable to dispose a flow guide between movable arc contactor 13 and insulation nozzle 15, and thereafter the arc-extinguishing insulation material molded product may be formed in the flow guide.

An insulation gas, for example, sulfur hexafluoride ($SF_6$), carbon dioxide ($CO_2$), trifluoroiodomethane ($CF_3I$), nitrogen ($N_2$), oxygen ($O_2$), tetrafluoromethane ($CF_4$), argon (Ar), helium (He), or a gas mixture containing at least two of these gases may be used as the arc-extinguishing gas. In particular, sulfur hexafluoride ($SF_6$) alone or a mixture thereof with carbon dioxide ($CO_2$) and nitrogen ($N_2$) is preferred.

Puffer cylinder 16 is connected to drive mechanism 4 through the intermediary of an operating rod 17 (a portion of rod 7 in FIG. 1). Also, a piston 18 is fixedly installed in the housing of the gas circuit breaker in a manner not shown. Puffer cylinder 16 and operating rod 17 and a bulkhead 24 fixed to puffer cylinder 16 enclose a space called as a thermal puffer chamber 19a. Meanwhile, puffer cylinder 16 and bulkhead 24 and operating rod 17 and piston 18 together enclose a space called as a machine puffer chamber 19b. Machine puffer chamber 19b is located between piston 18 and bulkhead 24 which is fixed to cylinder 16, when operating rod 17 is driven rightward in the figure, it narrows the space of machine puffer chamber 19b, and thereby, the arc-extinguishing gas in machine puffer chamber 19b is compressed, and the pressure is increased in machine puffer chamber 19b. When the pressure in machine puffer chamber 19b becomes greater than the pressure in thermal puffer chamber 19a, the arc-extinguishing insulation gas is blown out through a check valve 23 toward the insulation nozzle opening.

When the abovementioned gas circuit breaker is made to perform the disconnection operation from its preparatory state, a movable unit 11a is moved toward the side of drive mechanism 4 (rightward in FIGS. 2A and 2B). During the disconnection operation, as illustrated in FIG. 2A, in the first half of the interruption process, an electric arc 20 is generated between fixed arc contactor 14 and movable arc contactor 13.

Since electric arc 20 is of a high temperature, the arc-extinguishing gas around electric arc 20 is heated to a high temperature, and meanwhile, when the insulation nozzle formed from the arc-extinguishing insulator molded product is exposed to electric arc 20, a high-temperature gas is generated therefrom. As indicated by arrows in the figure, the generated high-temperature gas enters into thermal puffer chamber 19a through a space formed by insulation nozzle 15 and movable arc contactor 13. Due to the generated high-temperature gas, the gas pressure in thermal puffer chamber 19a is increased high enough to blow the insulation gas toward the opening of the insulation nozzle along with the disconnection operation.

Then, in the second half of the interruption process, as illustrated in FIG. 2B, electric arc 20 becomes weaker toward the current zero point, the pressure in machine puffer chamber 19b is increased along with the movement of the movable contactors to blow the high-pressure air in machine puffer chamber 19b toward the opening of the insulation nozzle through check valve 23.

In this way, while extinguishing the electric arc by blowing extinguishing gas toward the electric arc to release the heat present between the electrodes effectively to the outside, movable conductive conductor (movable electrode) 11 and fixed conductive contactor (fixed electrode) 12 are pulled apart to a distance sufficient to withstand a restriking voltage present between the electrodes, and thereby, the insulation between the electrodes is recovered and the interruption operation is completed. Particularly in the case where the gas circuit breaker is used in a high voltage system, since the restriking voltage appeared just before the completion of the interruption operation is larger, a longer distance is required between the electrodes so as to recover the insulation. According to the present invention, since the heat between the electrodes is released effectively to the outside, it is possible to shorten the required distance, which makes it possible to reduce the size of arc-extinguishing device 1 in the longitudinal direction.

Furthermore, since the high-temperature gas discharged from arc-extinguishing device 1 to the outside contains less hydrogen, such hydrogen-containing compound as hydrogen fluoride gas that can escalate corrosion or water that can deteriorate insulation will not be generated, and thereby, it is possible to suppress the insulation deterioration even though the insulation member used as insulation supporter 8 or the like is exposed to the gas.

Thus, according to the gas circuit breaker of the fourth embodiment, by using the arc-extinguishing insulation material molded product of the present invention to form a part of or the entire part of insulation nozzle in the vicinity of a contact point between contactors, hydrogen atoms or hydrogen ions contained in the high-temperature gas discharged from arc-extinguishing device 1 is decreased, and consequently, it is possible to suppress the formation of such hydrogen-containing compound as hydrogen fluoride that can deteriorate the insulation material or water than can degrade the insulation, which makes it possible to suppress the insulation deterioration while achieving sufficient puffer pressure. Thus, the gas circuit breaker according to the present embodiment provides remarkable effects such as capable of extinguishing the insulation deterioration and capable of being made smaller due to the contribution of the simple-structured drive mechanism.

EXAMPLES

Hereinafter, the present invention will be described in accordance with examples, but the present invention is not limited thereto.

Examples 1-3

Comparative Examples 1-3

A variety of polymers listed in Table 1 were prepared. As the fluorinated polyether-based polymer, in Example 1, a commercially available perfluoropolyether rubber (ShoreA hardness of 50) was used, and in Example 2, a commercially available silicone cross-linked product (a cured product of two-liquid type material, ShoreA hardness of 70, containing silicon dioxide) A of fluorinated polyether was used, and in Example 3, a commercially available silicone cross-linked product B (a cured product of two-liquid type material, containing no silicon dioxide) of fluorinated polyether was used. After molding and machining these polymers, predetermined arc-extinguishing insulation material molded products (Examples 1-3 and Comparative Examples 1-3) were obtained.

For tetrafluoroethylene resin of Comparative Example 1, after the raw material composition is compression-molded at room temperature under a pressure of 200 kg/cm$^2$, it is required to be calcined at 370° C. in order to obtain the molded product. In contrast, after the silicone cross-linked product of fluorinated polyether of Example 2 was molded in a mold by using a liquid or paste-like material made of a high-molecular compound having a fluorinated polyether main chain and a terminal silicone cross-linking reaction group, it can undergo a primary molding through thermal curing and a secondary molding through machining, which makes it superior in formability.

For the molded products of Examples 1-3 and Comparative Examples 1-3, the hydrogen content (the content of hydrogen atoms in the constituent elements in the polymer) was measured, and the pressure of gas generated by the molded product and the corrosiveness thereof to the insulation member were evaluated. The results of these measurements and evaluations were listed in Table 1.

(Measurement of Hydrogen Content)

The measurement of the hydrogen content (the content of hydrogen atoms in the constituent elements in the polymer) was performed according to the CHN elemental analysis method. Specifically, the molded product was heated in a helium/oxygen gas stream to a high temperature of combustion so as to oxidize each of the constituent elements in the molded product, and thereby, the carbon element was oxidized to $CO_2$, the hydrogen element was oxidized to $H_2O$, and the nitrogen element was oxidized to $NO_N$, and these oxides were further introduced into a reduction furnace including a reduced copper so as to reduce $NO_x$ to $N_2$. Then, the hydrogen content in each molded product was calculated through quantification of the generated $H_2O$. In addition, since the molded product contains fluorine, which will make the measurement data unstable, it is necessary to pay sufficient attention to measurement conditions such as by raising the combustion temperature higher than normal (for example, combusting at 1150° C.). In order to eliminate the influence of moisture, before the measurement, each molded product was dried under reduced pressure (at 50° C.) for 2 hours.

(Evaluation on Pressure of Gas Generated by Molded Product and Corrosiveness Thereof to Insulation Member)

First, $SF_6$ gas was introduced into a sealed chamber housing the gas circuit breaker containing the molded product, the interruption test was performed by disconnecting the contactors at conditions of a rated voltage at 84 kV, an electric current at 20 kA (effective value) and an interruption time for 10 to 15 ms to generate the electric arc for 10 times.

In order to evaluate the pressure of the generated gas, the ratio of the maximum pressure of the generated gas among the 10 interruption tests to the maximum pressure of the generated gas among the 10 interruption tests for Comparative Example 1 was calculated as the pressure ratio of the generated gas.

The corrosiveness to the insulation member was evaluated in the interruption test by disposing another epoxy resin molded product attached with an electrode at a position in the chamber without being exposed to the electric arc and observing the change of surface resistance before and after the interruption. The corrosiveness was evaluated as YES if the surface resistivity of the epoxy resin molded product after the test was reduced by more than 2 orders from the initial value (for example, if the initial value is $10^{13}$ Ω/sq., and the surface resistivity after test is less than $10^{11}$ Ω/sq.).

TABLE 1

| Example/ Comparative Example | Material | Hydrogen Content (mass %) | Pressure Ratio of Generated Gas | Corrosive to Insulator |
|---|---|---|---|---|
| Example 1 | perfluoropolyether rubber | 0.3 | 2.0 | NO |
| Example 2 | Silicone cross-linked product A of fluorinated polyether | 0.4 | 1.6 | NO |
| Example 3 | Silicone cross-linked product B of fluorinated polyether | <0.3 | 1.4 | NO |
| Comparative Example 1 | tetrafluoroethylene resin | <0.3 | 1.0 | NO |
| Comparative Example 2 | polyoxymethylene | 6.7 | 3.0 | YES |
| Comparative Example 3 | melamine resin | 5.3 | 1.6 | YES |

As shown by the results in Table 1, in comparison to Comparative Example 1 (tetrafluoroethylene resin), it can be seen that in Examples 1-3 the pressure of the generated gas was increased, and no corrosion to the insulator caused by the generation of gas was observed. For polyoxymethylene (non-fluorinated polyether resin) of Comparative Example 2 and melamine resin of Comparative Example 3, the pressure of generated gas was higher than the case of tetrafluoroethylene resin of Comparative Example 1, but corrosion to the insulator caused by the generation of gas was observed, and thereby, each of them cannot be applied to a gas circuit breaker containing $SF_6$.

It is obvious from the above results that the arc-extinguishing insulation material molded product in each of Examples 1-3 can produce higher pressure of the generated gas, has excellent interruption performance, and can suppress the corrosiveness to the insulator caused by the generated gas. Since the arc-extinguishing insulation material molded product of Comparative Examples 2 and 3 has a hydrogen content greater than 2 mass % and the gas generated thereby is corrosive to the insulator, neither can be applied to a gas circuit breaker containing $SF_6$.

Examples 4-10

Comparative Example 4

Table 2 lists the types of polymers used in the production of the arc-extinguishing insulation material molded products, and the types, the average particle size, the maximum particle size and the formulation amount of wear-resistant fillers for Examples 4-10 and Comparative Example 4. Each polymer was formulated with a respective wear-resistant filler at a predetermined ratio to form a composition, and the composition was molded and then machined to provide a predetermined arc-extinguishing insulation material molded product (for Example 4-10 and Comparative Example 4).

For each arc-extinguishing insulation material molded product obtained in Examples 4-10 and Comparative Example 4, the interruption test similar to the above one was performed to evaluate the pressure ratio of gas generated by the molded product, the wear ratio (weight ratio) of the composition constituting the arc-extinguishing insulation material molded product and the presence of internal wear. The pressure ratio of generated gas was calculated relative to the maximum pressure of Example 2. The wear ratio was calculated relative to Example 2 by using the weight difference (wear amount) of the arc-extinguishing insulation material molded product before and after the interruption test. The internal wear was performed through the observation of the cross section of the arc-extinguishing insulation material molded product after the interruption test, and was determined as YES when there is a blast part present inside the molded product different from that on the surface. The results are listed in Table 2.

TABLE 2

| Example/ Comparative Example | Resin | Inorganic Filler | | | Evaluation Result | | |
|---|---|---|---|---|---|---|---|
| | | Type | Average Particle Size (μm) | Maximum Particle Size (μm) | Formulation Amount (v %) | Pressure Ratio of Generated Gas (Relative to Example 2) | Wear Ratio | Internal Wear |
| Example4 | Silicone cross-linked product of fluorinated polyether | Boron nitride | 1.5 | 7 | 1 | 0.94 | 0.85 | NO |
| Example5 | | Boron nitride | 1.5 | 7 | 5 | 0.89 | 0.80 | NO |
| Example6 | | Boron nitride | 1.5 | 7 | 7 | 0.85 | 0.79 | NO |
| Example7 | | Boron nitride | 9.0 | 48 | 5 | 0.88 | 0.85 | NO |
| Example8 | | Boron nitride | 18 | 50 | 5 | 0.88 | 0.88 | NO |
| Example9 | | Alumina | 2.1 | 20 | 5 | 0.80 | 0.89 | NO |
| Example10 | | Titanium oxide | 0.61 | 2 | 1 | 0.91 | 0.91 | NO |
| Comparative Example4 | Tetrafluoroethylene resin | Boron nitride | 7.0 | 40 | 5 | 0.63 | 0.5 | YES |

As shown by the results in Table 2, compared to Example 2 where no wear-resistant filler (boron nitride, aluminum oxide, titanium oxide) is added, the wear amount of the arc-extinguishing insulation material molded product in each of Examples 4-10 is suppressed. Moreover, the arc-extinguishing insulator molded material of each Example of 4 to 10 can produce a higher gas pressure than Comparative Example 4 in which 5 vol % of boron nitride was added to tetrafluoroethylene resin. Furthermore, no internal wear was observed in Examples 4 to 10, but the internal wear was observed in Comparative Example 4.

From the above, it can be seen that owing to the formulation of a wear-resistant filler such as boron nitride, the arc-extinguishing insulation material molded product in Examples 4 to 10 is effective in extinguishing the wear amount of the arc-extinguishing insulation material molded product after the interruption test, can generate higher gas pressure, and is superior in interruption performance.

It should be understood that the embodiments and the examples disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: arc-extinguishing device; 2: first bushing; 2a: first conductor; 3: second bushing; 3a: second conductor; 4: drive mechanism; 5: operating member; 6: link; 7: rod; 8: insulation supporter; 9: housing; 10: slidable unit; 11: movable conductive contactor; 11a: movable unit; 12: fixed conductive contactor; 13: movable arc contactor; 14: fixed arc contactor; 15: insulation nozzle; 16: puffer cylinder; 17: operating rod; piston: 18; 19a: thermal puffer chamber; 19b: machine puffer chamber; 20: electric arc; 21: hollow portion; 22: vents; 23: check valve; 24: bulkhead

The invention claimed is:
1. A gas circuit breaker, comprising:
an electrode and
an insulation material molded product in the vicinity of the electrode,
wherein the insulation material molded product comprises a polymer comprising a carbon-oxygen bond in the main chain, in which a part of or all of terminal atoms are at least one kind of atom selected from the group consisting of fluorine atoms, chlorine atoms, bromine atoms, iodine atoms and astatine atoms.
2. The gas circuit breaker of claim 1, further comprising an insulation gas.
3. The gas circuit breaker of claim 2, wherein the insulation gas is $SF_6$.
4. The gas circuit breaker of claim 1, wherein the polymer is the main component of the insulation material molded product.
5. The gas circuit breaker of claim 1, wherein a content of hydrogen atoms in the constituent elements in the polymer is not more than 2 mass %.
6. The gas circuit breaker of claim 1, wherein a part of or all of the terminal atoms are fluorine atoms.
7. The gas circuit breaker of claim 1, wherein the polymer is a polyether-based polymer.
8. The gas circuit breaker of claim 7, wherein the polyether-based polymer comprises no benzene ring in the repeating unit of the polyether.
9. The gas circuit breaker of claim 7, wherein the polyether-based polymer is a fluorinated polyether-based polymer.
10. The gas circuit breaker of claim 1, wherein the polymer comprises silicon atoms in the main chain.
11. The gas circuit breaker of claim 1, wherein the polymer is a silicone cross-linked product of fluorinated polyether.
12. The gas circuit breaker of claim 11, wherein the polymer further comprises silicon dioxide.
13. The gas circuit breaker of claim 1, wherein the insulation material molded product further comprises at least one member selected from the group consisting of boron nitride, aluminum oxide and titanium oxide as a filler.
14. The gas circuit breaker of claim 1, wherein a part of or all of terminal atoms are chlorine atoms.
15. The gas circuit breaker of claim 1, wherein a part of or all of terminal atoms are bromine atoms.
16. The gas circuit breaker of claim 1, wherein a part of or all of terminal atoms are iodine atoms.
17. The gas circuit breaker of claim 1, wherein a part of or all of terminal atoms are astatine atoms.
18. The gas circuit breaker of claim 1, wherein the polymer is represented by Formula 1-1:

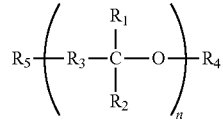

(Formula 1-1)

wherein
each of $R_1$, $R_2$, $R_3$, $R_4$ and $R_5$ is an independent functional group containing carbon, nitrogen, oxygen, silicon, hydrogen, and/or fluorine, and
n is a natural number.
19. The gas circuit breaker of claim 18, wherein at least one of the functional groups of $R_1$, $R_2$, $R_3$, $R_4$ and $R_5$ contains a fluorine atom, and
n is 2 to 5000.
20. A gas circuit breaker, comprising:
an electrode and
an insulation material molded product in the vicinity of the electrode,
wherein the insulation material molded product comprises a polymer comprising a carbon-oxygen bond and silicon atoms in the main chain, in which a part of or all of terminal atoms are non-hydrogen atoms.

* * * * *